Figure 3:
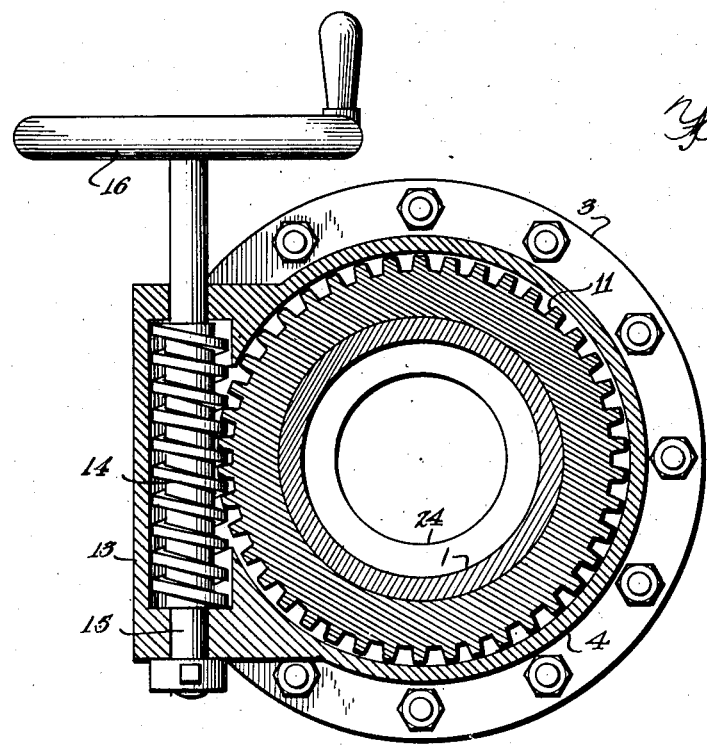

Sept. 7, 1926.
C. W. DUNCAN
1,599,168
VALVE
Filed May 12, 1924    2 Sheets-Sheet 1
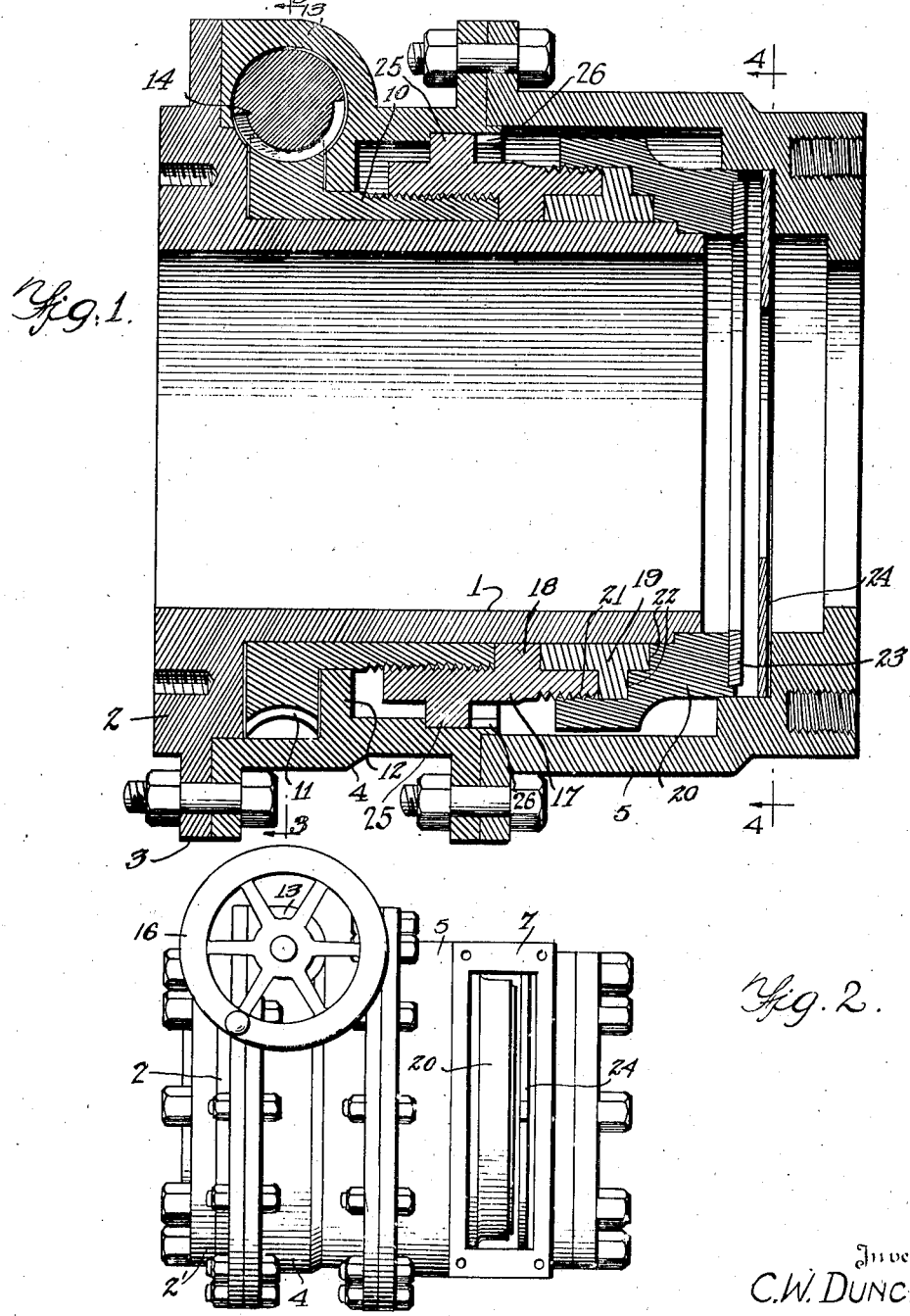
Inventor
C.W. DUNCAN
By G.W. Earnshaw
Attorney Sept. 7, 1926.

C. W. DUNCAN

VALVE

Filed May 12, 1924

1,599,168

2 Sheets-Sheet 2

Inventor
C. W. DUNCAN

By G. W. Earnshaw
Attorney

Patented Sept. 7, 1926.

1,599,168

UNITED STATES PATENT OFFICE.

CHARLES W. DUNCAN, OF SAPULPA, OKLAHOMA.

VALVE.

Application filed May 12, 1924. Serial No. 712,831.

This invention relates to improvements in gate valves for controlling the volume of gas passing through a line or pipe and furnishing a means for measuring the same for commercial purposes.

It is well known throughout the gas producing sections of the country that production of gas at the wells varies both in volume and pressure, and the consumption through the service lines also varies with the demand. It has, therefore, become necessary to the industry to provide a controlling system.

Orifice disks for determining the volume of gas passing through a line at a given temperature and pressure have been employed, but heretofore the meter orifice disk has been placed in a specially constructed flange union requiring the breakage of the gas line and the services of two or more men to make a change in the disk or repair the same. A further disadvantage is that the disk valve has generally been placed in a heavy, cumbersome and expensive operating mechanism that is impractical for smaller lines.

An object of the present invention is to provide an apparatus that is reasonably light in weight, and that may be easily handled in line construction.

A further object of the invention is the provision of a device in which worn out and defective disks may be easily replaced in a small fraction of the time now consumed in changing the disks used in the present type of valves.

A further object of the invention is the provision of a valve construction in which the usual orifice disks now on the market may be employed interchangeably.

A further object is the provision of a light weight, strong, durable, and quickly operated orifice disk holding valve that can be manufactured at a low cost.

In the accompanying drawings, I have shown one embodiment of the invention. In this showing:—

Figure 4:
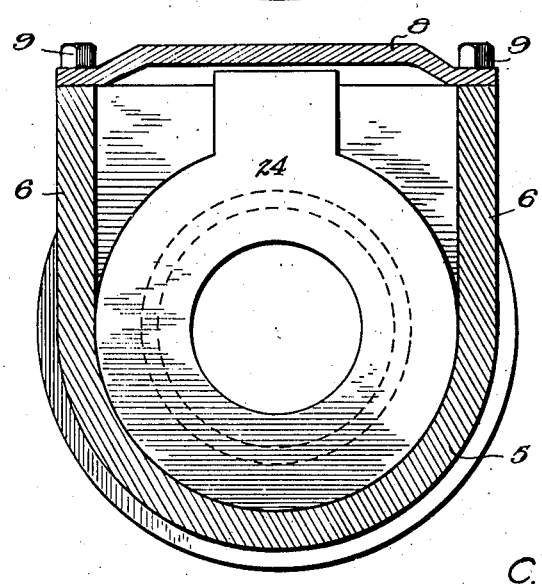

Figure 1 is a horizontal sectional view through the assembled valve construction, Figure 2 is a plan view, Figure 3 is a vertical sectional view on line 3—3 of Figure 1, and, Figure 4 is a similar view on line 4—4 of Figure 1.

Referring to the drawings, the reference numeral 1 designates the valve cylinder which is of substantially the same diameter as the pipe line to which it is to be connected and is in effect an extension of the pipe line, having a smooth interior surface and extending nearly to the orifice disk. One end of the cylinder is provided with a flange 2, which is extended, as at 3, to form a rear housing section. The flange 2 is further provided with threaded openings for attaching the field flange 2′ (see Figure 2) to the valve housing. The housing comprises a center section 4 and a forward end 5. As shown (see Figure 4), a portion of the side walls of the forward end are extended upwardly substantially parallel to each other, as at 6, and provided with a flat upper surface 7. The surface 7 is provided with an opening adapted to be closed by a plate 8, retained in position by means of bolts 9. A sleeve 10 is arranged exteriorly of the cylinder adjacent its rear end and a worm wheel 11 is formed on the end of the sleeve. As shown, the worm wheel is arranged between the flange 2 of the cylinder and an internal annular flange 12 formed on the central housing section which prevents longitudinal movement thereof. The central housing section is provided with an extension 13 forming a casing for a worm 14. This worm is mounted on a shaft or rod 15, journaled in the end walls of the extension and one end of the shaft projects an appreciable distance from the extension and is provided with a hand wheel 16.

The sleeve 10 is externally threaded at its forward end, and is adapted to receive a sliding seat carrier 17. The sliding seat carrier is provided with a shoulder or rib 18 adjacent its forward end and suitable packing 19 is arranged between this shoulder and the inner cylinder to prevent leakage of gas. A sliding valve seat member 20 is secured to the forward end of the sliding seat carrier. As shown, the rear portion of the sliding member 20 is of greater diameter than the diameter of the sliding seat carrier and this rear portion is provided with internal threads adapted to engage external threads on the forward end of the sliding seat carrier, as indicated at 21. The diameter of the sliding member 20 decreases adjacent the forward end, forming shoulders 22 which retain the packing 19 in position. The forward end of the sliding member is provided with a recess for the reception of a gasket 23, which contacts with an orifice disk 24 of the usual construction. The sliding seat carrier 17 is provided with a plurality of longitudinally extending ribs 25 adapted to be received in grooves 26 on the interior of the center section 4 to prevent rotation of the members 17, 19 and 20.

The operation of the device will be apparent from the foregoing description. The valve is first connected in the line in the usual manner. When a disk is to be removed or inserted, the hand wheel 16 is turned to the left to revolve the sleeve 10 thus moving the sliding seat carrier 17, and the sliding member 20 backward and loosening the orifice disk 24 to permit its removal. The valve casing is opened by removing the plate 8 and a new disk may be readily inserted. After the new disk has been placed in position, the hand wheel is turned in the opposite direction, causing the sliding seat member 20 to clamp the disk against the end of the forward section 5 of the housing.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:—

1. In a device of the character described, a cylinder, a sectional housing surrounding said cylinder, the forward section of said housing extending beyond said cylinder and provided with a reduced opening forming a shoulder, an orifice disk arranged in said section and adapted to be clamped against said shoulder, a sliding seat member arranged on the exterior of said cylinder and adapted to clamp said disk against said shoulder, a seat carrier connected to said seat member and arranged exteriorly of said cylinder, said seat member and said seat carrier being spaced from said cylinder adjacent the point of connection, packing arranged between said seat member and said seat carrier, and means for operating said seat carrier and said seat member from the exterior of said housing.

2. In a device of the character described, a cylinder, a sectional housing surrounding said cylinder, the forward section of said housing extending beyond said cylinder and provided with a reduced opening forming a shoulder, an orifice disk arranged in said section and adapted to be clamped against said shoulder, a sliding seat member arranged on the exterior of said cylinder and adapted to clamp said disk against said shoulder, a seat carrier connected to said seat member and arranged exteriorly of said cylinder, a sleeve rotatably mounted on said cylinder, said sleeve having threaded engagement with said seat carrier whereby rotation of said sleeve will move said seat carrier and said seat member longitudinally, and means for rotating said sleeve.

In testimony whereof, I affix my signature.

CHARLES W. DUNCAN.